United States Patent [19]

Criss

[11] Patent Number: 4,939,348

[45] Date of Patent: Jul. 3, 1990

[54] DISCONTINUITY DETECTOR IN A HEATED TRANSPARENCY

[75] Inventor: Russell C. Criss, Pittsburgh, Pa.

[73] Assignee: PPG Industries, Inc., Pittsburgh, Pa.

[21] Appl. No.: 374,333

[22] Filed: Jun. 30, 1989

Related U.S. Application Data

[63] Continuation of Ser. No. 144,153, Jan. 15, 1988.

[51] Int. Cl.[5] .............................................. H05B 3/10
[52] U.S. Cl. .................................... 219/547; 219/203; 219/522
[58] Field of Search ............... 219/203, 547, 548, 553, 219/507, 522, 509; 174/68.5; 204/192.1

[56] References Cited

U.S. PATENT DOCUMENTS

| 3,379,859 | 4/1968 | Marriott | 219/522 |
| 3,876,862 | 4/1975 | Newman et al. | 219/509 |
| 3,892,947 | 7/1975 | Strengholt | 219/522 |
| 3,895,213 | 7/1975 | Levin | 219/203 |
| 4,323,726 | 4/1982 | Criss et al. | 174/68.5 |
| 4,543,466 | 9/1985 | Ramus | 219/203 |
| 4,565,919 | 1/1986 | Bitter et al. | 219/522 X |
| 4,610,771 | 9/1986 | Gillery | 204/192.1 |
| 4,668,270 | 5/1987 | Ramus | 65/106 |
| 4,808,799 | 2/1989 | Schave | 219/522 |

Primary Examiner—George H. Miller, Jr.
Assistant Examiner—Marvin M. Lateef
Attorney, Agent, or Firm—Dennis G. Millman

[57] ABSTRACT

A discontinuity detection system for a heated transparency such as a windshield is provided wherein a break in any portion of the bus bars is detected. A voltage sensor lead extends from the farthest extremity of the longest length of bus bar.

9 Claims, 1 Drawing Sheet

DISCONTINUITY DETECTOR IN A HEATED TRANSPARENCY

This is a continuation of application Ser. No. 144,153, filed Jan. 15, 1988.

BACKGROUND OF THE INVENTION

This invention relates to an improvement in an electrically heated transparency such as may be employed in a vehicle to provide defrosting, deicing, or defogging capability. In particular, the improvement is in the means to detect discontinuities in the electric circuit in the transparency.

It has been known to pass electric current through a transparent conductive coating on a transparency in order to raise the temperature of the transparency. Generally, a source of electrical potential is connected to the conductive coating by way of a pair of bus bars along opposite sides of the area of the transparency to be heated. The bus bars have low resistivity relative to the coating and are intended to distribute the current evenly over the area to be heated. The bus bars may be comprised of metallic foil strips, but in the case of glass transparencies they preferably are comprised of a metallic-ceramic frit material fused onto a surface of the transparency. A typical arrangement includes bus bars configured as substantially parallel stripes on opposite sides of the heated area, with electrical leads attached to each bus bar and extending away from the opposite edges of the transparency as shown in U.S. Pat. Nos. 4,323,726 (Criss et al.) and 4,668,270 (Ramus) Locating the leads on the same side of the transparency and preferably closely adjacent to each other is advantageous for the sake of easier installation of the transparency in the vehicle and simplifying the connection with the electrical power source. Therefore, U.S. Pat. Nos. 3,895,213 (Levin) and 4,543,466 (Ramus) provide an extension of one of the bus bars around an end of the transparency so that connections to both bus bars can be made in one relatively compact area.

A crack in a heated transparency can alter the electric heating circuit in ways that can cause further damage to the transparency or have other undesirable effects A discontinuity in the coating extending with a transverse component to the direction of current flow will increase the overall resistance of the heated area, with the result that power output increases in the uneffected areas. Not only will the heating be ineffective in the damaged area, but also the increased power in the remainder of transparency can raise temperatures to such an extent that the transparency may be thermally damaged. Excessive temperatures can extend propagation of a crack in glass or melt a plastic ply. A break in a bus bar, can radically concentrate the electric power in a small area, depending upon the location of the break. Because of the relatively large amount of current flowing along the bus bars, a defect such as a partial break that increases the resistance of a bus bar is particularly prone to cause localized overheating in the region near the defect. This can occur at any location along the bus bars, but it is particularly serious at locations where a bus bar is carrying the full current or a major portion of the current, such as in an extension leading to a remote bus bar. At high voltage locations, arcing across an open gap in the conductive material can also occur detrimentally. Although arcing is most likely to occur at a bus bar break, it can also occur across a discontinuity in the conductive coating. Because of the additional harm that overheating or arcing can cause in the transparency when minor damage occurs, it is considered desirable to provide means to detect such an occurrence so as to trigger an alarm device or to automatically remove electrical power from the heating system.

One approach that has been proposed for detecting bus bar breaks in a heated transparency employs a thin electroconductive voltage sensor lead applied to the transparency along with the bus bars. The sensor lead parallels the extension of the upper bus bar along one side of a windshield and contacts the bus bar system at the upper corner where the upper bus bar and the extension meet. External circuitry is provided to detect a voltage change along the extension evidencing a discontinuity in the extension. This approach is limited to detecting breaks in only the extension portion of the bus bars, and although breaks there may have serious consequences, it would be desirable to detect breaks at other locations as well, including the entire bus bar system.

SUMMARY OF THE INVENTION

In the present invention an improvement to an electrically heated transparency is provided whereby a break at any location of the bus bars is detectable. This is achieved by measuring the voltage drop along the longest bus bar (including its extensions) from its terminal connection end to its distal end. An electroconductive voltage sensor lead is provided on the transparency, preferably in the same manner as the bus bars, extending along the margins of the transparency from the terminal connection area to the distal end of the bus bar pattern. The bus bars, an extension or extensions leading to the remote bus bar, and the voltage sensor lead together completely encircle the periphery of the transparency, thereby permitting a voltage change to be detected in the event of a crack at any edge portion of the transparency.

In arrangements in which bus bars are provided along two sides of the transparency, and an extension of one of the bus bars is located along a third side, the sensor lead may advantageously extend along the fourth side of the transparency, whereby crack detection is provided around the entire perimeter. In other arrangements in which the entire perimeter is bordered by bus bars and their extensions, the voltage sensor lead may extend around substantially the entire periphery parallel to the longest length of bus bar and may be connected to the bus bar at the far end of its circumferential path.

A voltage comparator circuit is employed to detect voltage differences that indicate a discontinuity in the bus bars or a crack in the transparency. The voltage between the power input terminal location of the bus bar and the end of the bus bar as picked up by the voltage sensor lead is measured by the comparator. Since the bus bar material is relatively conductive, any voltage applied to the connection terminal of a bus bar by the external power source will be essentially the same as the voltage measured at the far end of the bus bar via the voltage sensor lead. But if a discontinuity occurs in either the bus bar or the voltage sensor lead, the voltage returned to the comparator by the voltage sensor lead will not be the same as the voltage applied to the bus bar terminal. This detected voltage difference may used to trigger an alarm or to shut off the power supply to the heater circuit.

The invention will be understood more fully from the detailed description of specific embodiments which follows and the accompanying drawings.

THE DRAWINGS

DETAILED DESCRIPTION

The description of the preferred embodiment herein is in reference to a laminated transparency comprised of two plies of glass bonded together by an interlayer of plastic since that is the typical windshield construction. But it should be understood that the invention can apply to heated transparencies involving a single ply of glass with a single ply of plastic, all plastic laminations, and other combinations involving numerous plies. The transparency need not be intended for use as an automobile windshield, but may be any window for a vehicle or other enclosure, including aircraft.

Figure 1:
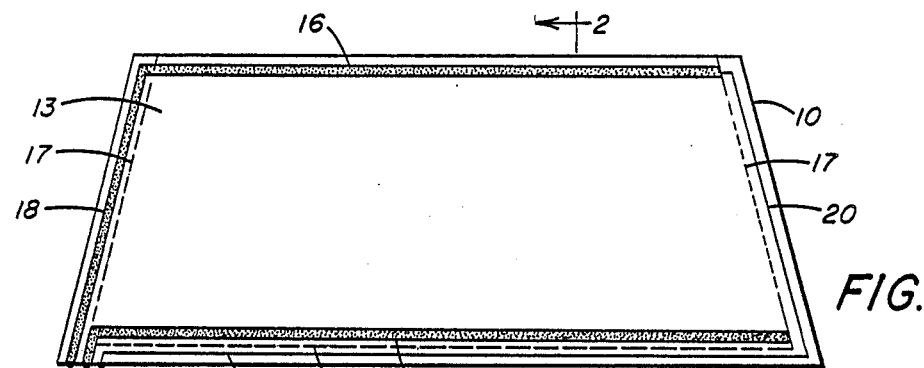
FIG. 1 is a schematic depiction of a heated transparency incorporating an embodiment of the present invention in connection with a bus bar arrangement that includes a single extension to the upper bus bar.
Figure 2:
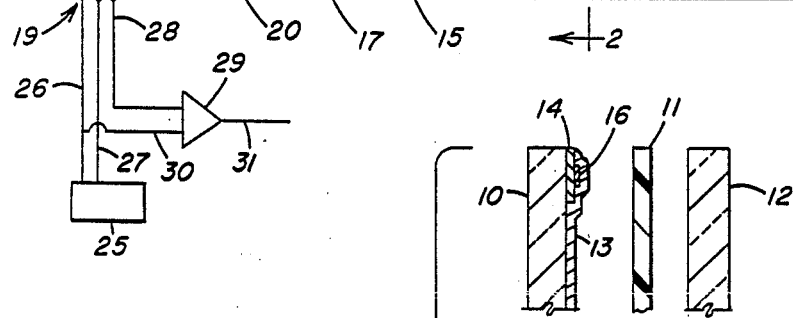
FIG. 2 is an exploded, cross-sectional, enlarged view of a typical laminated windshield construction as may be incorporated in the embodiment of FIG. 1, taken along line 2—2 in FIG. 1.

In the example shown in FIG. 1 and in greater detail in FIG. 2 the transparency is comprised of an outboard glass sheet 10, a plastic interlayer 11 which may be polyvinylbutyral as is commonly used for laminated windshields or other suitable interlayer material, and an inboard sheet of glass 12. An electroconductive coating 13 is preferably placed on a surface that is not exposed, most preferably on the inboard side of the outboard glass sheet 10. Various coatings may exhibit the combination of transparency and electroconductivity to serve as the heating element for a windshield or the like, but a preferred coating is that disclosed in U.S. Pat. No. 4,610,771 (Gillery), the disclosure of which is hereby incorporated by reference. That coating comprises a film of silver between films of zinc stannate, each of which may be applied sequentially by magnetron sputtering. The silver acts as the conductive layer and the zinc stannate films serve to mask the reflectance of the silver. The coating exhibits appropriate resistivity for use as a heated windshield when the silver layer has a thickness of about 110 angstroms, for example.

An optional feature shown in FIG. 2 but omitted from FIG. 1 for the sake of clarity is an opaque border 14 which may be ceramic enamel applied to the flat glass surface by silk screening and fired on during the heating of the sheet for bending or in a separate heating step. The opaque border serves to conceal attachment means and other elements when installed in a vehicle, and may also conceal the bus bars of the heating circuit.

With continued reference to FIGS. 1 and 2, a bottom bus bar 15 and top bus bar 16 are in contact with the coating 13. Line 17 indicates a edge of the coating 13 spaced from the sides and bottom edges of the transparency, leaving an uncoated margin along three sides thereof. The uncoated marginal areas may be created by masking those areas during the coating process. Optionally the entire sheet could be coated and the coating subsequently deleted from those areas. The uncoated marginal areas permit connections to be made to the upper bus bar 16 without contact with the coating 13. As shown in FIG. 1, the electric power connection to the upper bus bar consists of a conductive extension strip 18 extending along a side edge portion. As shown in FIG. 1, the lower bus bar 15 and the upper bus bar extension 18 may terminate closely adjacent to each other at a terminal region 19 which, in the typical embodiment illustrated, is located at a lower corner of the transparency. A common terminal area for all of the circuit lines is preferred for the sake of convenient installation in a vehicle, but is not essential to all aspects of the present invention. It should also be understood that the terminal region could be at any edge of the transparency and need not be at a corner.

A voltage sensor lead 20 is shown in FIG. 1 originating in the terminal region 19, extending parallel to the bottom bus bar 15 and along the side edge portion opposite from the extension 18 into contact with the end of the upper bus bar 16. Since the voltage sensor lead is not required to carry as much current as the bus bars, it may be considerably smaller in width than the bus bars, preferably consisting of a fine line. Connection to the voltage sensor lead 20 at the common terminal area is convenient, but not essential. Connecting the voltage sensor lead 20 to the external comparator circuit at, for example, the lower right hand corner of the transparency as viewed in FIG. 1 (thus eliminating the need for the horizontal segment of the lead 20) would provide discontinuity detection superior to the prior art in that any discontinuity along the entire length of the upper bus bar 16 and the extension 18 would be detected. Even greater break detection capabilities result when the horizontal segment is provided because a break along the bottom bus bar 15 will also sever the horizontal segment of the voltage sensor lead 20, thereby triggering the detection means. In that case the detection system is sensitive to breaks along all sides of the transparency.

The bus bars and the voltage sensor lead may conveniently consist of the same electroconductive material applied to the substrate in the same step. Suitable electroconductive bus bar materials are well known in the art, typically comprising a ceramic frit material containing a metal such as silver, which may be applied to the substrate in slurry form by silk screening in the desired pattern. The frit is then fused by heating, either in a separate step or as part of a bending operation, thereby fixing the electroconductive pattern onto the substrate. The conductivity of the bus bars is chosen to be considerably greater than that of the coating 13.

A source of electrical power 25 is connected to the bus bars by way of electrical leads 26 and 27 which contact the respective bus bars in the terminal region 19 of the transparency. Another lead 28 joins the voltage sensor lead 20 to a comparator circuit 29. The reference voltage is provided to the comparator by way of a lead 30 which is in common with the power source lead connected to the upper bus bar extension 18. Output 31 from the comparator may carry a signal generated by the comparator in response to a detected voltage difference indicating a discontinuity.

Figure 3:
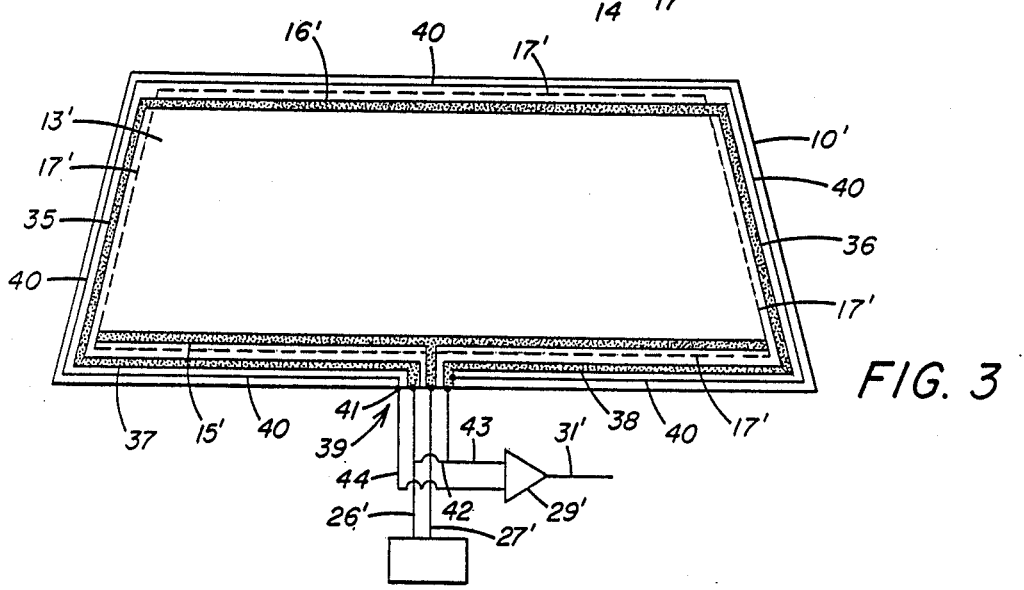
FIG. 3 is a schematic depiction of a heated transparency incorporating an alternative embodiment of the present invention involving a bus bar arrangement that includes dual extensions to the upper bus bar.

Turning now to FIG. 3, there is shown an alternative embodiment of heated transparency which may be of the same construction as described for the FIG. 1 embodiment, but with a different bus bar pattern and discontinuity detection arrangement. The bus bars in FIG. 3 differ from FIG. 1 in that dual extensions to the upper bus bar are provided and a central terminal location 30 is featured in FIG. 3. It should be understood that the dual extension arrangement could be employed with a corner terminal location as well. Elements that serve the same function as in FIG. 1 are given the same reference numerals in FIG. 3 and the descriptions thereof will not be repeated. In this embodiment, two electroconductive side extension strips 35 and 36 along opposite side marginal portions of the transparency supply power to the upper bus bar 16'. Additionally, the extensions 35 and 36 may be further extended to a common terminal area 39 by bottom extension strips 37 and 38, respectively. The extension strips 35, 36, 37, and 38 are insulated from the coating 13' by deletion of the coating along the side and bottom margin areas.

In an embodiment such as shown in FIG. 3, where one length of bus bar and its extensions substantially circumscribe the transparency, it is preferred that the voltage sensor lead 40 take a substantially parallel path around the perimeter so as to extend its sensitivity to breaks to the full length of the bus bar system. Thus, the voltage sensor lead 40 shown in FIG. 3 originates at a terminal connection 41 in the terminal area 39, extends around the perimeter of the transparency, and is connected to the bottom extension strip 38 near the terminus of the latter in or near the terminal area 39. The external circuitry may be essentially the same as that described above in connection with the FIG. 1 embodiment, with the exception that one pole of the power source is connected to both extensions of the upper bus bar by way of lead 26' and jumper 42. The voltage applied at the terminal area to the upper bus bar is also supplied to the comparator 29' by lead 43 as the reference voltage. The terminal 41 of the voltage sensor lead 40 is connected to the comparator by a lead 44. A break in a peripheral portion of the transparency that severs the voltage sensor lead 40 will cause the comparator to detect a voltage difference and to generate a signal since the voltage applied to the terminus of section 38 will then differ significantly from the voltage at terminal 41 of the voltage sensor lead 40. Because of its close adjacency, the voltage sensor lead 40 provides break detection for any of the bus bar sections 16', 35, 36, 37, or 38.

This description has been set forth with reference to particular embodiments for the sake of providing the best mode of practicing the invention, but it should be understood that variations and modifications known to those in the art may be resorted to without departing from the scope of the invention as defined by the claims that follow.

I claim:

1. An electrically heated transparency comprising: a transparent sheet, a transparent electroconductive coating on a major surface of the sheet, a first bus bar in contact with the coating along a first marginal edge portion of the sheet, a second bus bar in contact with the coating along a second marginal edge portion of the sheet, the second bus bar having an electroconductive extension out of contact with the coating extending from an end of the bus along a third marginal edge portion of the sheet toward a terminal connection area, and an electroconductive voltage sensor lead on the sheet extending along a fourth marginal edge portion of the sheet toward the terminal connection from the end of the second bus bar opposite from the extension, whereby a break at any marginal edge portion of the sheet is detectable.

2. The apparatus of claim 1 wherein a portion of the voltage sensor lead extends substantially parallel to the first bus bar.

3. The apparatus of claim 1 wherein the transparency comprises a laminated vehicle glazing unit having at least one ply of glass and at least one ply of plastic.

4. The apparatus of claim 1 wherein the first and second bus bars and the voltage sensor lead terminate in close proximity to each other in the terminal connection area at the first marginal edge portion of the sheet.

5. The apparatus of claim 1 wherein the voltage sensor lead is considerably smaller in width than the bus bars or extension.

6. An electrically heated transparency comprising: a transparent sheet, a transparent electroconductive coating on a major surface of the sheet, a first bus bar in contact with the coating along a first marginal edge portion of the sheet, a second bus bar arrangement including a main bus bar portion in contact with the coating along a second marginal edge portion of the sheet and including extension portions leading from opposite ends of the main portion along marginal edge portions of the sheet toward a terminal area whereby the second bus bar portions together circumscribe substantially the entire periphery of the sheet, and a voltage sensor lead comprised of a line of electroconductive material between the edge of the sheet and the second bus bar arrangement extending along substantially the entire length of the second bus bar arrangement so as to circumscribe substantially the entire transparency and to provide break detection to the entire length of the second bus bar systems without requiring the bus bar itself to break.

7. The apparatus of claim 6 wherein the first bus bar, second bus bar extension portions, and voltage sensor lead terminate in close proximity to each other at the terminal area at the first marginal edge portion of the sheet.

8. The apparatus of claim 6 wherein the voltage sensor lead is considerably smaller in width than the bus bars or the extensions.

9. The apparatus of claim 6 wherein the transparency comprises a laminated vehicle glazing unit having at least one ply of glass and at least one ply of plastic.

* * * * *